Patented Jan. 4, 1938

2,104,595

UNITED STATES PATENT OFFICE 2,104,595

MANUFACTURE OF SUBSTANTIVE DYE-STUFFS

Erik Schirm, Dessau-in-Anhalt, Germany, assignor, by mesne assignments, to General Aniline Works, Inc., New York, N. Y., a corporation of Delaware No Drawing. Application January 25, 1933, Serial No. 653,486. In Germany January 29, 1932

14 Claims. (Cl. 260—1)

This invention relates to improvements in and relating to the manufacture of substantive dyestuffs.

It is already known that, by benzoylating such dyestuff intermediates, as for example 2-amino-5-naphtol-7-sulphonic acid or dehydrothiotoludine sulphonic acid, which already have a certain affinity to the vegetable fibre or at any rate act in a markedly "substantivating" manner, this property can be increased. It is also known that in a similar manner two molecules of non or only slightly substantive (adsorbed by cotton) dyestuffs or dyestuff intermediates having a free amino group can be coupled by means of phosgene to the corresponding urea derivatives, whereby a pronounced substantivity of the condensation product is brought about.

It has now been found that the property of substantivity can be quite markedly produced or increased if unsaturated aliphatic, alicyclic, fatty aromatic or heterocyclic compounds with one or more carbonyl groups are condensed, in a manner known per se with dyestuffs or their intermediates, the dyestuff formation being, in the latter event then brought about in known manner.

Among the carbonyl compounds in question, which are easily available, and are therefore of special interest the following may be mentioned by way of examples: mesityloxide, phoron, crotonaldehyde, crotonic acid, sorbic acid, trichlorphenomallic acid, fumaric acid, muconic acid, cinnamic aldehyde, benzalacetone, dibenzalacetone and other condensation products of aliphatic, alicyclic, aromatic or fatty aromatic aldehydes and ketones with each other, cinnamic acid, cinnamalactic and -pyruvic acids, further furfurol, furan-$\alpha$-carbonic acid, furan-$\alpha,\alpha'$-dicarbonic acid, pyridine-2,5-dicarbonic acid and the like. Instead of the free carboxylic acids, reactive derivatives of the same such as anhydrides, chlorides or esters can be employed.

The dyestuffs or dyestuff-components to be condensed with the above-mentioned carbonyl compounds are not confined to azo dyestuffs or azo or diazo components but can belong to any of the desired dyestuff classes, as for example nitro-, azine-, oxazine-, thiazine, acridine-, triphenyl-methane, anthraquinone or their parent substances. The only condition is that the substances to be condensed should possess reactive hydrogen atoms which separate with the carbonyl oxygen in the form of water under formation of a double bond, which is preferably conjugated with ring or chain double bonds. In the condensation of amino dyestuff intermediates with carboxylic acid compounds herein before described, the reaction is considered to involve the elimination of the double bonded or carbonyl oxygen rather than the hydroxyl oxygen in the formation of water, but it is not desired that the invention be limited to such action if the theory in fact is incorrect. The movable hydrogen atoms may be attached to a carbon or a nitrogen atom. As examples of the former case there may be mentioned 2,4-dinitro-toluol, 2,4,6-trinitrotoluol or 1-methyl-2,4-dinitro-3-hydroxybenzene-6-sulphonic acid, the methyl group of which reacts with cinnamic aldehyde and the like with separation of water and formation of "substantivating" dyestuff intermediates or substantive nitro dyestuffs. Moreover, compounds such as $\alpha$-picoline or quinoldine or their derivatives, aceto-aectic arylides and their sulphonic acids and like compounds should be referred to. The second case occurs with all dyestuffs having free amino groups and with similar intermediates insofar as the character of the compounds as a dyestuff intermediate is not removed by the change of the amino group in the sense of the present process.

In order to facilitate the clear understanding of the invention several examples of how it may be carried out will now be given in greater detail, but it should be understood that these are given as examples only, as it will be obvious that many different substances and variations in process details can be employed without departing from the scope of the invention.

Example 1

216 parts of p-phenylenediamine are melted together with 148 parts of cinnamic acid; the mixture is gradually heated to 265° C. and is kept at this temperature until no further formation of water vapour occurs. The cooled melt is next boiled out repeatedly with plenty of water for removing the excess p-phenylenediamine employed. The residue is dissolved in 800 parts of 95% alcohol whilst warming and filtered hot from small quantities of di-cinnamoyl-p-phenylenediamine formed as a by-product. On cooling cinnamoyl-p-phenylenediamine crystallises from the filtrate and is isolated by suction or pressure and dried.

238 parts of the intermediate product are intimately ground with 284 parts of hydrochloric acid of 20° Bé. and sufficient water to form a thin paste. A solution of 70 parts sodium nitrite in 300 parts of water is added, the mixture being cooled with ice and stirred for several hours until the diazotization has been completed. The diazo suspension is then introduced with good stirring into an ice-cooled solution of 348 parts of sodium 2-naphtol-3,6-disulphonate (R-salt) in 5,000 parts of water to which 200 parts of calcined soda have been added. The stirring is continued at a low temperature until the coupling has been completed, the mixture is then heated up to 80–100° C., salted out and filtered off. The separated dyestuff can be obtained pure by recrystallizing from hot water; it energetically dyes cotton or viscose silk violet and has very good properties of fastness. Its affinity to vegetable fibre is clearly greater than that of the analogous dyestuff obtained from benzoyl-p-phenylenediamine and R-salt.

The same dyestuff can also be obtained by diazotizing p-aminoacetanilide or p-nitraniline, coupling with R-salt, creating a free amino group by saponifying the acetyl radicle or reducing the nitro group and treating the thus changed dyestuff with cinnamic acid chloride in neutral, slightly alkaline or slightly acid solution. Instead of using R-salt other preferably higher sulphonated naphtol-sulphonic acids can be employed as azo components, such for example as 1-naphtol-3,6,8-trisulphonic acid or 2-naphtol-3,6,8-trisulphonic acid or amino-naphtol-sulphonic acids such for example as 1,8-amino-naphtol-3,6-disulphonic acid and the like.

*Example 2*

341 parts 1,8-amino-naphtol-3,6-disulphonic acid (H-acid, mono sodium salt) are dissolved in 10,000 parts of water with 40 parts of caustic soda and 400 parts of crystallized sodium acetate are added; if necessary the mixture is rendered slightly acid with acetic acid. 166,5 parts of cinnamic acid chloride are separately dissolved in 150 parts of acetone and the solution is allowed to run gradually and under stirring at room temperature into the H-acid solution, when the condensation product will commence to separate out with a thickening of the mass towards the end of the operation. The mixture is carefully neutralized with caustic soda solution, but without completely removing the acid reaction, stirring is continued for some hours and the mixture is then slowly heated to 85° C., when the whole changes to a clear solution which is kept at this temperature for a short time. On recooling the condensation product is again precipitated; it is filtered off and can be purified by recrystallization from water.

493 parts of the thus obtained disodium salt of cinnamoyl H-acid are dissolved in 20,000 parts of water with the addition of 200 parts of calcined soda, when a deep yellow solution is obtained which is cooled to 0–5° C. A benzene diazonium chloride solution obtained in known manner from 93 parts of aniline is now gradually stirred in. The coupling is very quickly completed, whereupon the dyestuff is salted out hot and filtered hot. The dyeing on cotton is clear, blue-tinged red, fast to acids. The corresponding dyestuff from aniline and benzoyl H-acid has hardly any substantive properties.

By combining the cinnamoyl-H-acid with diazotized aminoazobenzene a substantive violet is obtained, by combining with the diazotized mono azo dye aniline→1-amino-naphtaline-7-sulphonic acid a greenish blue.

*Example 3*

239 parts of 2-amino-8-naphtol-6-sulphonic acid (gamma acid) are dissolved in 1,000 parts of pyridine and 200 parts of water. The solution is cooled to 2° C. and a solution of 166.5 parts of cinnamic acid chloride in 150 parts of acetone is slowly added with constant cooling so that the temperature does not rise materially above 5° C. After a further hour's stirring at a low temperature, the latter is gradually raised to about 75° C. and the solution is exactly neutralized by the introduction of small quantities of a lukewarm 30% soda solution. Thereupon the solution is evaporated to dryness in vacuo in order to remove the pyridine, the residue is dissolved in 2,500 parts of hot water, and the condensation product is separated out by the addition of common salt and cooling. Finally the product is filtered and dried.

391 parts of the sodium salt of cinnamoyl-gamma-acid thus obtained (100%) are dissolved in 7,500 parts of water with the addition of 200 parts of anhydrous soda, whereby a lemon yellow solution is obtained which is cooled to 5°. A diazo solution obtained in the usual manner from 173 parts of metanilic acid is now allowed to run into the solution, which is kept stirred and at a temperature of 5–8° C. The stirring is continued for some time, the solution warmed, salted out, filtered and the product dried.

The dyestuff obtained dyes cotton to scarlet red, acid fast tones. The corresponding benzoylated dyestuff has only quite feeble substantive properties. If on the other hand the cinnamic acid radicle in the above dyestuff is replaced by the radicle of hydrocinnamic acid

$(C_6H_5CH_2CH_2CO—)$, the substantivity disappears entirely.

*Example 4*

The cinnamic acid chloride in Example 3 is replaced by the equivalent quantity of crude cinnamal-acetylchloride which is obtained by mixing 174 parts of cinnamal acetic acid with 200 parts of thionyl chloride at 25° C., and when the vigorous reaction has died down warming the mixture gently using a reflux condenser until the generation of hydrogen chloride has ceased and then removing the excess of thionyl chloride in vacuo. The cinnamal-acetyl chloride which solidifies in a crystalline form on cooling is like the cinnamic acid chloride dissolved in 150 parts of acetone and treated further as in Example 3.

The extraction of the cinnamal-acetyl-gamma-acid from the reaction mixture is likewise effected as in Example 3 but after the vacuum evaporation considerably more water must be used for the solution of the sodium salt.

The coupling with metanilic acid must likewise be undertaken at a greater dilution but it is not necessary that the sodium salt of the cinnamal-acetyl-gamma-acid, which with soda also yields a deep yellow solution, should be completely dissolved.

The resulting dyestuff is extremely similar in all its properties to that of Example 3.

*Example 5*

239 parts of 2-amino-5-naphthol-7-sulphonic acid are dissolved in 1000 parts of pyridine and 200 parts of water. This solution is cooled down to 2° C., whereupon a solution of 200 parts of cinnamic acid chloride in 200 parts of acetone is slowly added under cooling and stirring, so that the temperature does not rise materially above 5° C. After a further hour's stirring at a low temperature, the solution is kept for 12 hours at room-temperature, then it is carefully neutralized by a soda-solution. Thereupon one evaporates to dryness in vacuo; the residue is dissolved in 2000 parts of water, and 500 parts of common salt are added while hot. After a digestion for half an hour in the warmth one cools down to the normal temperature; then the precipitate is removed by suction, washed out by means of some solution of saturated common salt and dried. The yield of saliferous condensation product is 466 parts.

In combining the 2-cinnamoyl-amino-5-naphthol-7-sulfphonic acid thus obtained in the form of its sodium salt, with diazotized metanilic acid in a soda-alkaline solution as described in Example 3, one obtains a highly substantive dyestuff by which the cellulose fibre is tinged bright orange from a soda-alkaline or neutral salt bath.

Diazotized naphthionic acid with the same azo-component gives likewise a highly substantive bluish red which is perfectly fast to acid and alkali.

The combination of the 2-cinnamoyl-amino-5-naphthol-7-sulphonic acid with the diazotized mono - azo - dyestuff H - acid→α-naphthylamine gives a substantive blackish blue.

With the above described condensation it is allowed to replace the cinnamic acid chloride by pyromucic acid chloride or by the chlorides of the pyridine monocarbocyclic acids. The thus obtained intermediates combined with diazonium compounds give likewise highly substantive azodyestuffs.

*Example 6*

356 parts of 1-hydrazine-8-naphthol-3,6-disulphonic acid (monosodium salt, see German Patent 94,632) are dissolved in 1,000 parts of water with the addition of 120 parts of caustic soda solution of 40° Bé. and 132 parts of cinnamic aldehyde are then stirred in. The condensation product immediately separates out, the solution becoming lighter in color and the mixture becoming pulpy on cooling. The filtered and pressed reaction product is dissolved in 10,000 parts of water, cooled to from 0-5° C. and 200 parts of calcined soda are added. A benzene diazonium salt solution is allowed to run into the solution under continuous stirring and cooling until the excess of unchanged hydrazone compound is only quite small. The dyestuff is salted out cold, filtered, washed with a solution of common salt and dried; it dyes cotton a blue grey.

Quite analogous dyestuffs are obtained if 1-hydrazine-8-naphthol-3,6-disulphonic acid (or other hydrazine-naphthol-sulphonic acids) are condensed with benzalacetone or other unsaturated oxocompounds and the condensation products combined with diazo-components.

*Example 7*

504.5 parts of 2-methyl-3-amino-6-dimethylamino-phenazine (base of "neutral red" or "toluylene red") are dissolved hot in 3,000 parts of nitrobenzene. The solution is cooled to about 100° C. and 153 parts of fumaric acid chloride are added, stirring being continued for several hours at 100° C. The precipitate is filtered off with suction, brought into solution with plenty of water and hydrochloric acid, the hot solution filtered and the condensation product is separated in the form of its chlorhydrate from the filtrate on cooling. It dyes cotton red from a neutral or acetic acid bath. The dye, in accordance with the constitution of the dyestuff is not fast to alkali, but alkalifast dyestuffs of this class can be obtained if the aminophenazine is replaced by aminophenazonium compounds.

What I claim is:

1. In the manufacture of azo, azine, oxazine, thiazine, acridine, triphenylmethane, nitro and anthraquinone dyestuffs, the step which comprises condensing an intermediate product having a movable hydrogen atom, said product being suitable for the production of these dyestuffs and finally constituting part of the dyestuff molecules, with a compound corresponding to the general formula R—CO—X wherein R represents a member of the group consisting of hydrogen, halogen, and hydroxyl, alkoxyl groups and the radical of a hydrocarbon joined through a carbon atom thereof, and wherein X represents a member of the group consisting of the radicals —CH=CHR$^3$, in which R$^3$ represents a member of the group consisting of aryl and heterocyclic radicals and aralkyl radicals the aliphatic radical of which is unsaturated, and the said radicals of heterocyclic compounds containing a double bond at the carbon atoms attached to the CO groups, by elimination of water formed from the double bonded oxygen atom and a movable hydrogen atom of the said dyestuff intermediate, said condensation being such as to leave an active group adapted to cause or permit reaction for the formation of the said dyestuffs.

2. In the manufacture of azo, azine, oxazine, thiazine, acridine, triphenylmethane, nitro and anthraquinone dyestuffs, the step which comprises condensing an intermediate product possessing a primary amino group, said product being suitable for the production of these dyestuffs and finally constituting part of the dyestuff molecules, with a compound corresponding to the general formula R—CO—X wherein R represents a member of the group consisting of hydrogen, halogen, and hydroxyl, alkoxyl groups and the radical of a hydrocarbon joined through a carbon atom thereof, and wherein X represents a member of the group consisting of the radicals —CH=CHR$^3$, in which R$^3$ represents a member of the group consisting of aryl and heterocyclic radicals and aralkyl radicals the aliphatic radical of which is unsaturated, and the said radicals of heterocyclic compounds containing a double bond at the carbon atom attached to the CO group, by elimination of water formed from the double bonded oxygen atom and a movable hydrogen atom of the said dyestuff intermediate, said condensation being such as to leave an active group adapted to cause or permit reaction for the formation of the said dyestuffs.

3. In the manufacture of azo, azine, oxazine, thiazine, acridine, triphenylmethane, nitro and anthraquinone dyestuffs, the step which comprises condensing an aromatic diamine intermediate with a compound corresponding to the general formula R—CO—X wherein R represents a member of the group consisting of hydrogen, halogen, and hydroxyl, alkoxyl groups and the radical of a hydrocarbon joined through a carbon atom thereof, and wherein X represents a member of the group consisting of the radicals —CH=CHR$^3$, in which R$^3$ represents a member of the group consisting of aryl and heterocyclic radicals and aralkyl radicals the aliphatic radical of which is unsaturated, and the said radicals of heterocyclic compounds containing a double bond at the carbon atoms attached to the CO groups, by elimination of water formed from the double bonded oxygen atom and a movable hydrogen atom of the said dyestuff intermediate, said condensation being such as to leave an active group adapted to cause or permit reaction for the formation of the said dyestuffs.

4. In the manufacture of azo, azine, oxazine, thiazine, acridine, triphenylmethane, nitro and anthraquinone dyestuffs, the step which comprises condensing an aromatic diamino sulfonic acid intermediate with a compound corresponding to the general formula R—CO—X wherein R represents a member of the group consisting of hydrogen, halogen, and hydroxyl, alkoxyl groups and the radical of a hydrocarbon joined through a carbon atom thereof, and wherein X represents a member of the group consisting of the radicals —CH=CHR$^3$, in which R$^3$ represents a member of the group consisting of aryl and heterocyclic radicals and aralkyl radicals the aliphatic radical of which is unsaturated, and the said radicals of heterocyclic compounds containing a double bond at the carbon atoms attached to the CO groups, by elimination of water formed from the double bonded oxygen atom and a movable hydrogen atom of the said dyestuff intermediate, said condensation being such as to leave an active group adapted to cause or permit reaction for the formation of the said dyestuffs.

5. In the manufacture of azo, azine, oxazine, thiazine, acridine, triphenylmethane, nitro and anthraquinone dyestuffs, the step which comprises condensing an aromatic amino-hydroxy intermediate compound which finally forms part of the dyesuff molecules with a compound corresponding to the general formula R—CO—X wherein R represents a member of the group consisting of hydrogen, halogen, and hydroxyl, alkoxyl groups and the radical of a hydrocarbon joined through a carbon atom thereof, and wherein X represents a member of the group consisting of the radicals —CH=CHR$^3$, in which R$^3$ represents a member of the group consisting of aryl and heterocyclic radicals and aralkyl radicals the aliphatic radical of which is unsaturated, and the said radicals of heterocyclic compounds containing a double bond at the carbon atom attached to the CO group, by elimination of water formed from the double bonded oxygen atom and a movable hydrogen atom of the said dyestuff intermediate, said condensation being such as to leave an active group adapted to cause or permit reaction for the formation of the said dyestuffs.

6. In the manufacture of azo, azine, oxazine, thiazine, acridine, triphenylmethane, nitro and anthraquinone dyestuffs, the step which comprises condensing an aromatic aminohydroxy sulfonic acid intermediate which finally forms part of the dyestuff molecules with a compound corresponding to the general formula R—CO—X wherein R represents a member of the group consisting of hydrogen, halogen, and hydroxyl, alkoxyl groups and the radical of a hydrocarbon joined through a carbon atom thereof, and wherein X represents a member of the group consisting of the radicals —CH=CHR$^3$, in which R$^3$ represents a member of the group consisting of aryl and heterocyclic radicals and aralkyl radicals the aliphatic radical of which is unsaturated, and the radicals of heterocyclic compounds containing a double bond at the carbon atom attached to the CO group, by elimination of water formed from the double bonded oxygen atom and a movable hydrogen atom of the said dyestuff intermediate, said condensation being such as to leave an active group adapted to cause or permit reaction for the formation of the said dyestuffs.

7. In the manufacture of azo, azine, oxazine, thiazine, acridine, triphenylmethane, nitro and anthraquinone dyestuffs, the step which comprises condensing a dyestuff substance already characterized as a dyestuff and having a movable hydrogen atom with a compound corresponding to the general formula R—CO—X wherein R represents a member of the group consisting of hydrogen, halogen, and hydroxyl, alkoxyl groups and the radical of a hydrocarbon joined through a carbon atom thereof, and wherein X represents a member of the group consisting of the radicals —CH=CHR$^3$, in which R$^3$ represents a member of the group consisting of aryl and heterocyclic radicals and aralkyl radicals the aliphatic radical of which is unsaturated, and the said radicals of heterocyclic compounds containing a double bond at the carbon atoms attached to the CO groups, by elimination of water formed from the double bonded oxygen atom and a movable hydrogen atom of the said dyestuff intermediate.

8. In the manufacture of azo, azine, oxazine, thiazine, acridine, triphenylmethane, nitro and anthraquinone dyestuffs, the step which comprises condensing a dyestuff substance containing a primary amino group and already characterized as a dyestuff with a compound corresponding to the general formula R—CO—X wherein R represents a member of the group consisting of hydrogen, halogen, and hydroxyl, alkoxyl groups and the radical of a hydrocarbon joined through a carbon atom thereof, and wherein X represents a member of the group consisting of the radicals —CH=CHR$^3$, in which R$^3$ represents a member of the group consisting of aryl and heterocyclic radicals and aralkyl radicals the aliphatic radical of which is unsaturated, and the said radicals of heterocyclic compounds containing a double bond at the carbon atoms attached to the CO groups, by elimination of water formed from the double bonded oxygen atom and a movable hydrogen atom of the said dyestuff intermediate.

9. In the manufacture of azo dyestuffs, the step which comprises condensing an azo dyestuff containing a primary amino group with a compound corresponding to the general formula R—CO—X wherein R represents a member of the group consisting of hydrogen, halogen, and hydroxyl, alkoxyl groups and the radical of a hydrocarbon joined through a carbon atom thereof, and wherein X represents a member of the group consisting of the radicals —CH=CHR$^3$, in which R$^3$ represents a member of the group consisting of aryl and heterocyclic radicals and aralkyl radicals the aliphatic radical of which is unsaturated, and the said radicals of heterocyclic compounds containing a double bond at the carbon atoms attached to the CO groups, by elimination of water formed from the double bonded oxygen atom and a movable hydrogen atom of the said dyestuff intermediate.

10. In the manufacture of azo, azine, oxazine, thiazine, acridine, triphenylmethane, nitro and anthraquinone dyestuffs, the step which comprises condensing an intermediate product having a movable hydrogen atom, said product being suitable for the production of these dyestuffs and finally constituting part of the dyestuff molecules, with a compound corresponding to the general formula R—CO—CH=CH—R$^2$ wherein R represents a member of the group consisting of hydrogen, halogen, and hydroxyl, alkoxyl groups and the radical of a hydrocarbon joined through a carbon atom thereof, and wherein $R^2$ represents a hydrocarbon radical joined through a carbon atom thereof, said condensation being such as to leave an active group adapted to cause or permit reaction for the formation of the said dyestuff.

11. In the manufacture of azo, azine, oxazine, thiazine, acridine, triphenylmethane, nitro and anthraquinone dyestuffs, the step which comprises condensing an intermediate product having a movable hydrogen atom, said product being suitable for the production of these dyestuffs and finally constituting part of the dyestuff molecules with an aldehyde of the general formula H—CO—X wherein X represents a member of the group consisting of the radicals —CH=CHR$^3$, in which R$^3$ represents a member of the group consisting of aryl and heterocyclic radicals and aralkyl radicals the aliphatic radical of which is unsaturated, and the said radicals of heterocyclic compounds containing a double bond at the carbon atoms attached to the CO groups, by elimination of water formed from the double bonded oxygen atom and a movable hydrogen atom of the said dyestuff intermediate, said condensation being such as to leave an active group adapted to cause or permit reaction for the formation of the said dyestuffs.

12. In the manufacture of azo, azine, oxazine, thiazine, acridine, triphenylmethane, nitro and anthraquinone dyestuffs, the step which comprises condensing an intermediate product having a movable hydrogen atom, said product being suitable for the production of these dyestuffs and finally constituting part of the dyestuff molecules with a carboxylic acid of the general formula HO—CO—X wherein X represents a member of the group consisting of the radicals —CH=CHR$^3$, in which R$^3$ represents a member of the group consisting of aryl and heterocyclic radicals and aralkyl radicals the aliphatic radical of which is unsaturated, and the said radicals of heterocyclic compounds containing a double bond at the carbon atoms attached to the CO groups, by elimination of water formed from the double bonded oxygen atom and a movable hydrogen atom of the said dyestuff intermediate, said condensation being such as to leave an active group adapted to cause or permit reaction for the formation of the said dyestuffs.

13. In the manufacture of azo, azine, oxazine, thiazine, acridine, triphenylmethane, nitro and anthraquinone dyestuffs, the step which comprises condensing an intermediate product having a movable hydrogen atom, said product being suitable for the production of these dyestuffs and finally constituting part of the dyestuff molecules, with an acid halide of the general formula Y—CO—CH=CHR$^1$ wherein R$^1$ represents a hydrocarbon radical joined through a carbon atom thereof, and Y stands for a halogen atom.

14. In the manufacture of azo, azine, oxazine, thiazine, acridine, triphenylmethane, nitro and anthraquinone dyestuffs, the step which comprises condensing an intermediate product having a movable hydrogen atom, said product being suitable for the production of these dyestuffs and finally constituting part of the dyestuff molecules, with an acid chloride of the general formula Cl—CO—CH=CH—R$^1$ by elimination of water formed from the double bonded oxygen atom and a movable hydrogen atom of the said dyestuff intermediate wherein R$^1$ represents any hydrocarbon radical joined through a carbon atom thereof.

ERIK SCHIRM.